April 22, 1958    P. D. WURZBURGER    2,831,523
METHOD AND MEANS FOR MAKING ELBOWS BY FORCING
TUBULAR STOCK THROUGH A DIE Filed May 20, 1955     3 Sheets-Sheet 1

INVENTOR.
PAUL D. WURZBURGER.
BY Whittemore,
Hulbert & Belknap
Attorneys

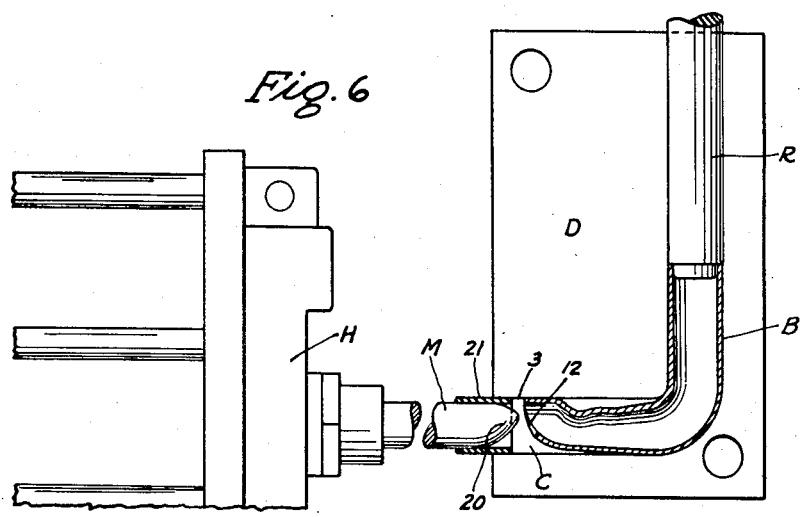
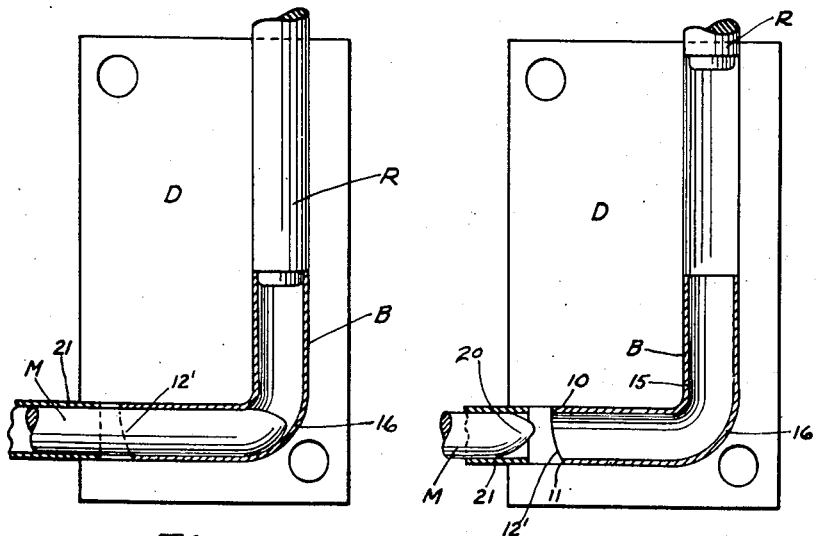

April 22, 1958 P. D. WURZBURGER 2,831,523
METHOD AND MEANS FOR MAKING ELBOWS BY FORCING
TUBULAR STOCK THROUGH A DIE
Filed May 20, 1955 3 Sheets-Sheet 3
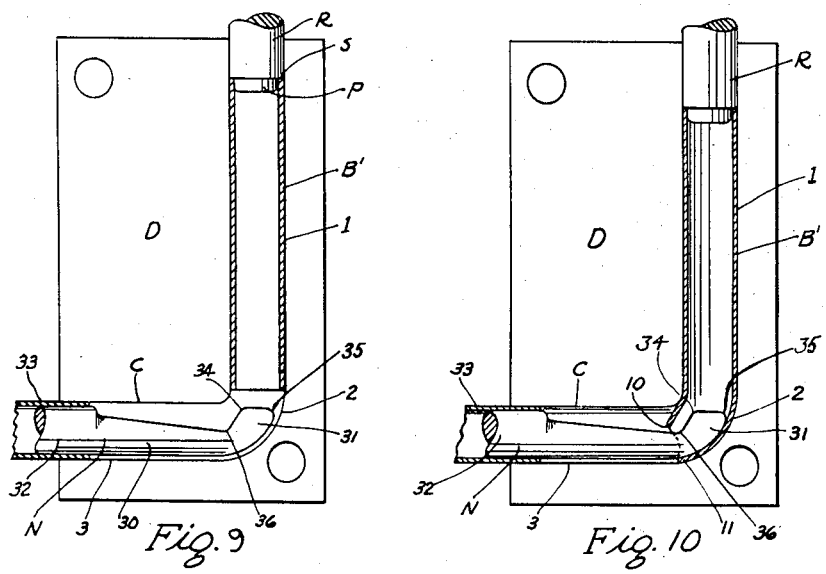
   
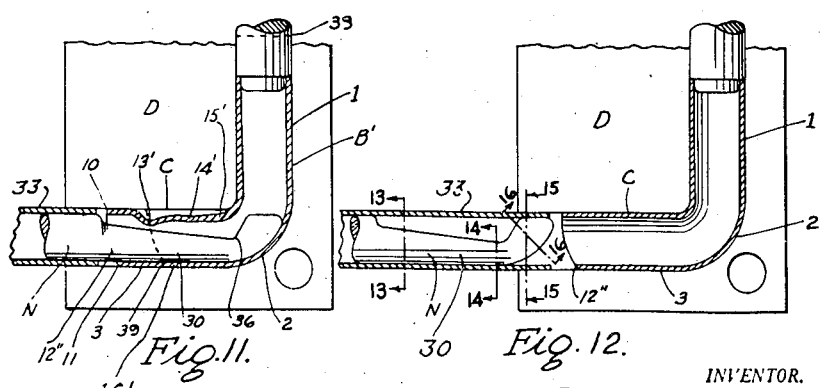
INVENTOR.
PAUL D. WURZBURGER.
BY Whittemore, Hulbert &
Belknap Attorneys a United States Patent Office 2,831,523
Patented Apr. 22, 1958

2,831,523

METHOD AND MEANS FOR MAKING ELBOWS BY FORCING TUBULAR STOCK THROUGH A DIE

Paul D. Wurzburger, Cleveland Heights, Ohio, assignor to Nibco, Inc., Elkhart, Ind., a corporation of Indiana Application April 12, 1951, Serial No. 220,632, now Patent No. 2,715,432, dated August 16, 1955, which is a continuation of abandoned application Serial No. 611,600, August 20, 1945. Divided and this application May 20, 1955, Serial No. 509,732

6 Claims. (Cl. 153—48)

This invention relates to a metal working and to a method of making tubular elbows and elbow fittings and more particularly, to a method of making short radius wrought elbows.

This application is a division of my prior copending application Serial No. 220,632, filed April 12, 1951, now Patent No. 2,715,432, granted August 16, 1955, which application is a continuation of my abandoned application, Serial No. 611,600, filed August 20, 1945.

In the art to which my invention pertains it has been known to make elbows of relatively large radius by merely forcing a tubular blank without internal support through the curved channel of a forming die. Such methods are limited in their use and application at the point where wrinkling and undesirable deformation of the metal begins to occur as the radius of curvature, in relation to, inter alia, the diameter of the desired elbow, is decreased. Having in mind the variations resulting from the use of different metals and the different relations of wall thickness to tube diameter, it may be taken as a general proposition that undesirable wrinkling limits this prior art method to making wrought 90-degree elbows or bends having a minimum radius of curvature, as measured on the external surface at the inner bend, about equal to the outside diameter of the tube.

When in the prior art it has been desired to make elbows of shorter or smaller radii in relation to diameter the teaching of the prior art has been to give the tube or blank internal support whereby to maintain its internal diameter at or substantially at its desired finished internal diameter whilst the blank is being bent as by movement through the angled channel of a forming die. Such internal support has been provided in filling the blank with more or less plastic or liquid material such as lead, sand, resin, tar or water and/or by causing sizing balls to move within the blank or piece whilst the blank is being bent. Others in the prior art have provided internal support for the extruded leg or posterior portion of the blank through supporting mandrels whereby to resist the tendency of the material to collapse inwardly upon being forced to take the small radius turn.

In the methods where internal support has been provided to resist the tendency of the walls of the blank or elbow to collapse inwardly or to wrinkle, there have been concomitant limitations, namely that resistance to the formation of wrinkles has built up, oft-times greatly or excessively, an increased resistance to forcing the work around the corner or bend of the forming channel. The effect of the internal support which requires the greater force to move the blank through the die is not limited merely to requiring greater working efforts to bring about the formation of the elbow but along with the greater working effort follows the greater stress and working of the metal of the blank as well as a tendency to thicken certain wall portions and/or thin out other portions and to expand the walls whereby to increase the frictional load between the outer surface of the blank and the channel of the die. These difficulties increase as the ratio of the radius of curvature to the diameter of the elbow is reduced so that the methods which rest upon internal support for the blank during the forming of the bend run to impracticabilities in waste of time, power or material, or in unsatisfactory products, excessive wear or injury to the dies, mandrels, tools and machines used to do the work. Moreover, these inherent limitations in the methods which are based upon internal support for the material of the elbow of necessity bring about reductions in the speed of production and increases in cost as well as many practical difficulties inherent in the very nature of the internal supporting means or mechanisms such as balls, articulated mandrels or in other instrumentalities.

It is among the objects of my invention to provide an improved method of forming elbow fittings which seeks to avoid the various difficulties discussed above by a simple process which is economical from the production point of view, yet practicable and satisfactory in operation. A more specific object of my invention is to provide a method of forming "short" radius elbow fittings of high and uniform strength, utility and quality. By short radius I have in mind that the ratio of the radius of the external surface of the inside corner of the elbow to the outside diameter thereof be less than unity, and preferably a small fraction of unity such as about one-third to one-quarter.

Another object of my invention is to produce a method of making short radius elbows in which the walls of the blank and elbow are substantially relieved of deleterious stresses and strains during the formation of the bend thereof and more particularly, during the formation of the bend in the elbow during the step of forcing the blank through an elbowed channel of a forming die.

Another object of my invention is to preserve a substantially uniform wall thickness in and throughout the parts of the elbow formed according to my invention. Another object of my invention is to provide a method of forming elbows which can be carried out with the expenditure of little or a minimum of power for forcing the blank through the die and/or working the material from an initial straight tubular form to a finished short radius elbow form. Another object of my invention is to substantially eliminate spring back in the elbow after the same is removed from the forming die or mechanism.

A primary object of my invention is to provide a method of forming commercially useful right angled elbows or elbow fittings having such a small ratio of radius of curvature to diameter that upon their being subjected to bending as by being forced through a forming die without internal support that the wall of the metal, particularly that adjacent to and beyond the inside corner thereof, tends to wrinkle and have other deformations from its ultimately desired shape. Another and more specific object of my invention is to provide a method for forming short radius elbows in which resistance to the formation of the bend of the elbow as by forcing a tubular blank through a ring angled channel of a forming die is maintained at a low value by the complete, substantial or partial elimination of internal support for the walls of the material at or adjacent the bend of the elbow while the same is being formed.

Other objects and advantages of my invention will appear from the following description of preferred and modified forms thereof, reference being had to the accompanying drawings in which:

Figure 6 is a view taken partially in the plane of the split of the forming dies showing the partially finished elbow in the position of Figure 3 preliminary to the entrance of an ironing mandrel.

Figure 7 is a view similar to Figure 6 in respect to the forming dies and the parts contained therein and associated therewith showing the ironing mandrel in advanced position.

Figure 8 is a view similar to Figure 7 showing an ironing mandrel in a retracted position following the step depicted in Figure 7.

Figure 9 is a view of a modified procedure and apparatus, the view being similar to that of Figure 1 and comprising a section taking in the plane of the split of the forming dies with the blank in its initial preformed position and with a modified form of ironing mandrel in place.

Figure 10 is a view similar to Figure 9 showing the blank in the position advanced from that shown in Figure 9.

Figure 11 is a view similar to Figure 10 showing the blank in its most advanced position preliminary to movement or withdrawal of the ironing mandrel.

Figure 12 is a view similar to Figure 11 showing the ironing mandrel in its withdrawn position after the same has ironed out the wrinkles from the extruded leg of the elbow.

Figures 13, 14, 15 and 16 are respectively transverse sectional views of the ironing mandrel shown in Figures 9 to 12 inclusive, taken along the lines 13—13, 14—14, 15—15, and 16—16 of the ironing mandrel of Figure 12.

Figure 3:
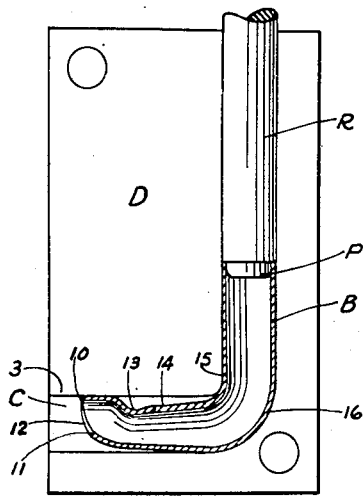
Figure 3 is a view similar to Figure 1 showing the blank in fully advanced position at substantially the end of the forming stroke.
Figure 4:
Figure 4 is a top plan view of the partially formed elbow in the condition shown in Figure 3.
Figure 5:
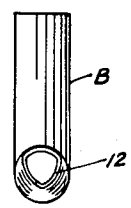
Figure 5 is an end elevation of the same partially formed elbow shown in Figures 4 and 3.

To accomplish the objects and advantages of my invention I place a tubular blank of malleable and ductile material to be formed into the elbow in the channel of a forming die which has a short radius elbowed form substantially corresponding to the external form of the finished elbow. Then preferably without substantially supporting the blank interiorly I cause to be exerted a longitudinal force on the trailing edge of blank remote from the bend of the elbow and thereby forcibly advance the blank through the bend of the channel of the die to give the elbow its angled form while permitting the material of the leading end of the blank to become wrinkled and deformed, but not excessively so, as it passes through and beyond the bend of the forming channel. I have found that at the completion of this step of the forming operation that the trailing leg and the bend of the partially formed elbow, see Figures 3, 4 and 5, are not only not deleteriously deformed but are in fact substantially superior in conformation, size, internal stress, wall thickness, contour and the like to similar parts formed by prior art methods in which effort has been made to provide internal support for those parts of the blank which tend to collapse or wrinkle while the blank is being forced through the angled channel of the die. Substantially all the wrinkling and deformation of the whole blank is concentrated in the leading, i. e., extruded leg of the piece, but since this leg has been free from internal support and has been permitted to take its own shape it has not been unduly stressed nor has it caused undue stresses, thickening or thinning out of other parts of the piece. After the piece has been given its initial elbow form, albeit with an imperfect leading leg, I thereafter, by means presently to be described, remove the imperfections from the leading leg and have for my product a short radius elbow with the desirable characteristics sought and mentioned above.

I have found my method to be practicable and advantageous when practiced with such malleable and ductile metals as hard or soft copper, low carbon steel, stainless steel and aluminum alloys as are commonly employed in commercial tubular stock. Without trying to state all the different kinds of metals or the range of sizes or relations of wall thickness to diameter in different materials with which my method may be advantageously practiced, my observations have been that while tubes or blanks or excessively soft metals and/or large diameters and/or thin walls require less effort to bend, the apparent advantage may tend to be more than offset when some or all of these characteristics admit of excessive thickening, wrinking or other undesirable effects in the work piece. The converse follows with excessively hard materials, small diameters and/or thick walls. Having these limitations in mind I have provided, as will more fully appear below, precautionary steps for controlling wrinkling, for example, in the leading leg of the elbow whereby to extend the useful range of my invention against the apparent limitations mentioned above. The following descriptions and illustrations of preferred and modified forms of my invention are based especially on tests and demonstrations employing one-half inch O. D. copper tube, soft temper, with 0.035" wall thickness; the finished elbow turning at 90 degrees about a one-eight inch inside radius of curvature.

Figure 1:
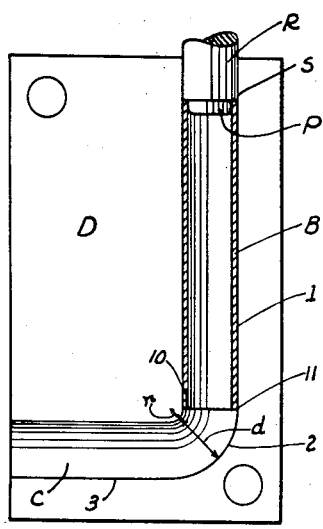
Figure 1 shows in longitudinal cross-section a tubular blank positioned in an initial position in one of a pair of split forming dies through which the blank is to be forced to give it its elbowed form.

A preferred form of carrying out the method according to my invention is illustrated in Figures 1 to 8 inclusive. In all these figures except 4 and 5, I've illustrated diagrammatically the half die D of a split pair of forming dies, the parting plane of which is in the plane of the drawings. Such die halves are opened in the known way to receive the blank, or piece, closed to form the forming channel of circular cross-section (the half channel C being shown in the half die D), held closed during the forming operation and finally opened to permit removal of the piece after it has been formed. The channel C has a straight cylindrical entering section 1 long enough to receive the tubular blank or work piece B, a bend 2 with inside radius $r$ and diameter $d$, the latter being equal to the diameter of the entering section 1, and the straight cylindrical forming section 2, the latter having its axis as shown at 90 degrees to the axis of the entering section 1. As shown in Figure 1, the blank B is preferably of the right cylindrical form with substantially square ends and preferably has an external diameter substantially equal to the internal diameter $d$ of the channel C. A power driven ram R enters the upper (as viewed) end of the section 1 of the channel C with its shoulder S engaging the end of the piece B and its pilot P entering and closely fitting the trailing end of the piece. In Figure 1 the ram R is in position preliminary to exerting the force, downwardly as viewed in Figure 1, whereby to urge the blank around the bend 2 of the channel of the die. The pilot P may be as long as the trailing leg of the finished elbow.

Figure 2:
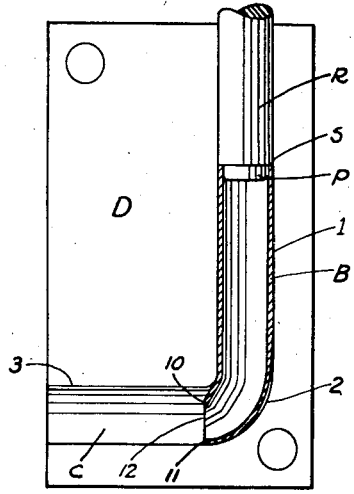
Figure 2 is a view similar to Figure 1 showing the blank in cross-section in an advanced position in its movement in the channel of the forming dies.

With the blank B positioned in the die D as shown in Figure 1, and without internal support for or engagement of the blank other than by the ram R and the interior surface after channel C, downward movement of the ram forces the leading end of the blank into the bend 2 of the channel C as shown in the midst of its travel in Figure 2. Here it will be observed that the inner leading edge 10 of the blank tends to continue in a straight line rather than to turn the corner whereas the outer leading edge 11 of the blank is being forced around the curved outer wall of the channel C and has substantially swung through an arc of about 90 degrees. As will also be observed in Figure 2, the wall of the blank adjacent the outer curve of the bend 2 has spaced itself a little away therefrom whilst the open leading end 12 of the blank has taken an irregular form incident to the permissive deformation that takes place during the travel of the work from the position shown in Figure 1 to that of Figure 3. The view of Figure 2 is intended to illustrate the position of the parts at the instant of their continuous movement through this stage of the advance of the blank through the channel of the forming die. Further continued movement 2 of the ram from the positions shown in Figures 1 and 2 brings the parts to the position shown in Figure 3 and thus to the end of its forming step. At the end of the stroke of the ram R, as shown in Figure 3, it will be observed that the elbowed piece has been given its general configuration with the leading inner edge 10 as well as the outer wall of the bend of the blank returned to contact with the wall of the channel C and the outer leading edge 11 of the blank has come out of contact with the adjacent wall of the channel. The open leading end 12 has taken a somewhat different form from that shown in Figure 2, and the upper surface of the extruded leg contains deep though smoothly formed wrinkles 13 and 14, see also Figures 4 and 5 wherein the elbowed piece B is shown in full as it would appear if removed from the dies after having been worked to the state of Figure 3. In this stage of the formation of the elbow it will be observed that while the inner wall 15 of the elbow has tended to thicken a little at the corner that the outer wall 16, particularly at the bend, has not been weakened or materially reduced in thickness. Moreover, it has been my observation that freedom from internal support and substantial interference with the natural bending and working of the metal has permitted the various parts of the piece to flow longitudinally and circumferentially relative to each other with relative freedom whereby to accommodate themselves to the change in form of the piece without requiring excessive (wall thickening) pressure from the ram and without fracture of or creating deleterious internal stresses within the piece.

Preferably, the work piece B is not removed from the dies after the above step as shown in Figure 3, is completed but rather the working of the piece is continued as shown in Figures 6 and 7. In Figure 6 the work piece and the ram R are shown in the same condition as in Figure 3. In Figure 6, however, there is shown in the left of the figure a second ram or ironing mandrel M connected with and actuated by such means as a hydraulic cylinder H whereby to give the mandrel M a rightward and leftward movement, as viewed in Figures 6, 7 and 8, under appropriate controls, not shown, to carry out the second step of my method about to be described. The mandrel M has a rounded nose 20 and enters the section 3 of the channel C of the dies D and the open leading end 12 of the work piece to expand the same as well as expand and iron out the wrinkles 13 and 14, to form the intended finished internal and external diameters of the extruded leg of the piece. Preferably, the mandrel M enters the channel C through a guiding sleeve 21 which has substantially the finished wall thickness of the work piece so that the mandrel is guided in axial alignment with the finished wall thickness desired to be formed in the leading leg of the work piece. Forcible movement of the ironing mandrel M from left to right as viewed in the drawings advances the mandrel from the position shown in Figure 6 to the position shown in Figure 7 whereby it will be seen that the wall of the leading leg of the elbowed piece has been brought back to substantially cylindrical form, eliminating the wrinkles 13 and 14 and opening the open leading end 12 of the elbow to substantially true right cylindrical configuration. While the ironing mandrel M is forcibly advanced from the position shown in Figure 6 to the position shown in Figure 7 the ram R is held in its most advanced position as shown in Figures 3–7 whereby to resist the tendency of the piece to be moved backward in the channel by the entering stroke of the mandrel M. During the inward and ironing stroke of the mandrel M not only is the wall of the leading leg of the piece expanded radially and brought to a more uniform wall thickness but also is the thickness and fullness of the outer bend 16 of the elbowed piece enhanced whereby to eliminate the tendency of the elbow to spring or "springback" to a somewhat different form than the angled form of the channel of the die.

After the mandrel M has been advanced to substantially its point of maximum penetration as shown in Figure 7, it is then forcibly withdrawn from the leading leg of the elbow, see Figure 8, its movement during its withdrawal adding to the burnish of the interior of the leg of the elbow and perfecting the desired form and finish thereof. Preferably, the ram R is withdrawn from engagement with the trailing end of the elbow after the ironing mandrel M has passed from contact with the leading leg thereof, see Figure 8. My method may be advantageously practiced either by direct manual control of the movements of the ram and mandrel or by appropriately correlated automatic or semi-automatic mechanisms and controls which can be adjusted to the practice and precepts of my invention.

When the parts have assumed the position shown in Figure 8 it remains merely to open the dies D and remove the elbowed piece. Thereafter, by appropriate steps known and practiced in the art before my invention, the respective ends of the elbowed piece may be treated by way of enlargement or other trimming or sizing to form appropriate sockets to receive tubes in capillary or other bonded joints or otherwise treated appropriately for the purposes to which the elbows are intended to be used.

The obliqueness of the leading end of the elbows as shown at 12' in Figure 8 is a thing which I have found to be substantially insignificant in respect to the essential steps of my process and the final finishing or sizing of the product, particularly with the materials which I have employed as mentioned above and in the so-called smaller sizes of elbows, i. e., about 1" or less outside diameter. In the event that the obliqueness of the leading end of the elbowed piece in the semi-finished form shown in Figure 8 takes on a deleterious significance in point of the final sizing, finishing or truing operations to be performed after the novel steps of my instant method are performed, then I find that I can substantially control the obliqueness of the opening 12' by cutting the end of the blank a little on the bias rather than truly in the right cylindrical form as shown in Figure 1. Where the blanks are cut on the bias I place them in the die so that the longer wall will be the "outside wall" of the bend of the elbow with the result that in the piece as shown in Figure 8 the outer leading edge 11 will lie more nearly directly opposite the outer leading edge 10. Otherwise, I prefer to use blanks with right angled ends since no care need be taken with respect to the position of the blank around its own axis in the dies.

Referring to Figures 9 through 16 a modified form of my method will now be described. Here, as shown in Figures 9 to 12 inclusive, I prefer to employ the same dies D, having the same forming channel C which in turn has the same entering section 1, bend 2 and forming section 3 all substantially identical in the structure and function as first above described. Here also, I may employ the same ram R with the shoulder S and pilot P, the action and function of which may be the same or substantially as above described. As shown in Figure 9, the blank tubular work piece B' may be the same as the piece B shown and described in Figure 1 and may fit the channel C of the die and be advanced therein by the ram R into and through the bend of the channel by the same movement of the ram R as above described.

In this modified form of my invention, however, I employ a different form of ironing mandrel N, see also Figures 13 to 16, and operate the mandrel N in a specifically different way from that in which the mandrel M is operated. As shown in Figure 9, the mandrel N has the whole of its working end 30 lying within the forming section 3 of the channel C with its head part 31 lying within the bend 2 of the channel. I prefer that the cylindrical shank portion 32 of the mandrel N slide with a snug sliding fit within a guide sleeve or tube 33 which preferably has substantially the same wall thickness as the ultimately desired wall thickness of the leading leg of the elbow whereby to guide the mandrel N axially in its movement within the channel and to support the lower side of the mandrel especially during the latter part of its ironing stroke as will be more fully described below. The mandrel N like the ram R and mandrel M is actuated by appropriate actuating means such as a hydraulic cylinder or otherwise whereby to give forceful rightward and leftward movement as viewed in the drawings in alignment with the axis of the forming section 3 of the channel C. The pilot sleeve 33 may also be appropriately actuated by power means not shown, whereby the end of the sleeve 33 may be disposed as much as little within the section 3 of the channel as may be desired in relation to the leading end or open end of the extruded leg of the elbow.

As shown with particular reference to Figures 13 to 16, the working end 30 of the mandrel N departs from the cylindrical form of the shank 32 thereof by a tapering relief cut away from the upper side of the mandrel as viewed in these figures, whilst the lower part of the working end of the mandrel retains a substantially semi-cylindrical cross-section from the end of the shank portion 32 up to the head portion 31 thereof. As shown more particularly in Figure 15, the top surface of the head 31 is substantially semi-cylindrical lying in a projection of the top surface of the shank 32. This semi-cylindrical surface extends approximately between the points 34 and 35 rightwardly and leftwardly, as viewed in Figure 9, and merges leftwardly, into a rounded upper surface which merges smoothly with the upper relief of the working part 30 of the mandrel at and about the point and corner 36. The forward and downward face of the head 31, comprising the surface opposite the outer bend 2 of the channel, is similar to the adjacent surface of the bend and thus substantially spherically formed whereby to be spaced from the outer bend of the channel approximately the thickness of the wall of the blank. As shown in Figure 9, it will appear conversely that the point 36 at the place of maximum relief is most widely spaced from the inner corner of the bend 2 of the channel whereby to permit the inner leading edge 10 of the blank B' to pass with desired freedom beyond the inner turn of the channel without substantially contacting or without excessive forceful bearing upon the mandrel N as the blank is advanced through the forming die, see Figure 10.

In this form of my invention while I do not entirely avoid all interior support or contact for the blank as it is advanced in the forming die, I have found that a mandrel shaped substantially like the mandrel N with the greater relief on its upper face, i. e., its face adjacent to and facing the inner turn of the channel, exerts little enough force or friction upon the inner surfaces of the blank as the latter is forced through the channel as to preserve substantially the advantages of the complete absence of internal support for the blank during the bending operation. Thus, when the ram R begins its stroke, downwardly as viewed in the drawing, forcing the blank along the section 1 of the channel into and through the bend 2 thereof and in part into the section 3 of the channel, the leading end of the blank encompasses and in the main slides freely past the head of the mandrel N as well as substantially all of the working end 30 thereof with much the same facility of movement that the blank has in the first step described with reference to Figures 2 and 3 above. As shown in Figure 10, the outer leading edge 11 of the blank passes between the smooth outer and lower surface of the head 31 of the mandrel whilst the inner leading edge 10 of the blank is bent away to the left as viewed in Figure 10, under the influence of the movement of the body of the blank and the curvilinear movement of the outer leading edge 11 and adjacent parts. Continued movement of the blank B' beyond the position shown in Figure 10 and approaching the position shown in Figure 11 may induce the inner leading edge 10 of the blank to contact more or less the upper relieved face of the working end of the mandrel more or less forcibly but with much less than harmful resistance to the movement of the blank through the forming channel. At the end of the forming stroke of the ram R the blank B' will have been given its elbowed form and the leading leg of the blank will have substantially encompassed the working end 30 and the mandrel N as shown in Figure 11. The inner wall of the leading leg of the elbow will be wrinkled as at 13' and 14' substantially corresponding to the wrinkles 13 and 14 above described, and the open leading end 12' of the piece will, have a configuration more nearly corresponding to the end 12' as shown in Figure 8, than the end 12 as shown in Figures 3, 4 and 5 above. It will also be noted in this form of my method that the outer wall of the bend of the elbow has been maintained in substantial contact throughout the whole of this forming step with the lower and outer working face of the head of the mandrel.

The elbowed blank, however, as shown in Figure 11 has been given its elbowed form with great freedom of the parts of the leading leg to wrinkle and take paths of longitudinal, curvilinear and circumferential movement with respect to the other parts and the axis of the leading leg whereby to be relatively free of deleterious stresses or tendencies to fracture, and similarly the ram R has not been called upon to deliver excessive forces to advance the blank longitudinally around the bend of the channel. Such little resistance as the mandrel N has offered to the movement of the blank B' will have tended in some measure to cause the inner wall 15' to be somewhat thicker than the inner wall 15, Figure 3, of the elbowed blank B and correspondingly, the outer wall 16' of the elbowed blank as shown in Figure 11 may well tend to be a little thicker than the outer wall 16 of the blank B under the circumstances shown in Figure 3. Following my fundamental teachings, however, it remains in this modified form, as it did in the preferred form, to iron out or smooth out the wrinkles and other deformations particularly in the extruded leg of the elbowed blank. Peculiarly, advantageous to the instant form of my method is the position of the ironing mandrel N, as shown in Figure 11, interiorly of the elbowed blank so that forcible withdrawal of the mandrel N will by virtue of its form and contour above described iron out and give the desired cylindrical contour to the leading leg of the elbowed blank. Leftward movement of the mandrel N, as viewed in Figures 11 and 12, will bring the upper semi-cylindrical surface of the head 31 with its rounded shoulder at 34 into ironing contact with the wrinkled and deformed inner wall 15' of the leading leg of the elbowed blank ironing the wrinkles out as the head of the mandrel progresses leftwardly from the position shown in Figure 11 to the position shown in Figure 12, and placing that portion of the wall 15' adjacent the inner turn of the channel in a state of drawing tension tending to thin the wall more or less especially adjacent the inner bend of the elbow depending upon the tightness of the fit of the head 31 in the extruded leg of the blank B'. While the mandrel N is being withdrawn and ironing out the inner wall 15' the mandrel, its working end 30 and the head 31 are supported in proper axial position by virtue of the bearing of the whole lower semi-cylindrical portion thereof upon the outer semi-cylindrical wall 16' of the leading leg of the elbow and upon the sleeve 33. When the mandrel N has been moved to the position shown in Figure 12 and after the ram R has been withdrawn as described in connection with the preceding form of my method the dies D may be opened and the elbowed blank, finished in the sense of being properly elbowed, may be removed from the dies for further sizing and finishing treatment in the same way and for the same purposes mentioned above. Preferably, the ram R is not withdrawn until after the ironing mandrel N has been withdrawn to the position shown for it in Figure 12 whereby to steady the elbow in the channel of the die during the ironing operation.

While I have found it practicable to form elbows in this modified form of my method by first causing the ram R to take its whole stroke before beginning the ironing stroke of the mandrel N, I have also found it advantageous to initiate the ironing stroke of the mandrel N prior to the full completion of the stroke of the ram R, i. e., the ironing stroke may begin when the ramming stroke is about three-fourths completed, i. e., with the trailing and leading ends of the blank at about the position of the dotted lines 39 as shown in Figure 11. Preferably, the ironing mandrel N then moves at a greater speed than the ram while both instrumentalities are moving and no substantial wrinkling or undesirable deformation occurs rightwardly of the withdrawing head of the mandrel N because the great tendency toward wrinkling and undesirable deformation takes place in the blank more nearly adjacent the leading end thereof than in those portions of the blank adjacent the bend, see Figures 3, 4 and 11, and cf. Figures 2 and 10. The correlation of the movement of the mandrel N and the ram R may be effected by manual and visual control or by automatic controls known in the art. Where both mandrels are sought to have motion at the same time, at least within the latter part of the ramming stroke, an automatic control to initiate the movement of the ironing mandrel at a particular point of the travel of the ram will be much preferred if not necessary to bring about the correlations of movements last above described. After the parts have first arrived at the position shown in Figure 12 the ironing mandrel N may be given additional reciprocatory ironing strokes while the ram R positions the piece if that be found necessary or desirable.

The drawings and the foregoing specification constitute a description of the improved method and means for making elbows in such full, clear, concise and exact terms as to enable any person skilled in the art to practice the invention, the scope of which is indicated by the appended claims.

What I claim as my invention is:

1. The method of forming elbows from tubular stock open at both ends which comprises forcing a tubular element endwise partly through a die structure comprising an elongated passage of circular cross-section having first and second straight end portions and an arcuately curved portion connecting said straight end portions and a mandrel having a head in said arcuately curved portion to define a generally annular space therewith and a shank in said second straight end portion, said head being of partly circular cross-section in planes perpendicular to the axis of said second straight end portion and said head and shank being shaped to provide an enlarged space within the second straight end portion at the side thereof adjacent the center of curvature of the arcuately curved portion, and partly through the annular space between said head and arcuately curved portion and partly into the enlarged space within the second straight end portion, and thereafter withdrawing said mandrel through the end part of said tubular element which has been forced beyond the annular space to smooth and straighten the end part into conformity with the straight end portion of the die.

2. Apparatus for forming elbows from tubular open ended elements comprising a die having an elongated passage extending therethrough, said passage consisting of two angularly related straight end portions and a curved intermediate portion connecting said end portions, a plunger movable into one straight end portion of said passage and having a reduced end portion dimensioned to fit within a tubular element which in turn fits within said passage, and a shoulder engageable with the end of such tubular element, a mandrel having a head adapted to be located within the curved intermediate portion of said passage and to define therewith an annular space, said mandrel having a reduced neck forming with the interior of the other straight end portion of the passage at the side thereof adjacent the center of curvature an enlarged chamber permitting wrinkling of the wall of the tubular element at the inside of a bend therein as it is forced around the curved portion of the passage into the said other straight end portion, means for forcing said plunger into one end of said passage, means for supporting said mandrel in the other end of said passage with said head located in the curved intermediate portion of said passage, and for withdrawing said mandrel from said passage after said plunger has been moved into said passage to force a tubular element partly around said curved intermediate portion of said passage through said annular space and into the straight end portion of said passage in which said mandrel is located.

3. Apparatus as defined in claim 2 in which said passage is of substantially uniform circular cross-section.

4. The method of forming an elbow from tubular stock which comprises placing the stock in a die having an elbow shaped passage including an arcuate bend, providing a headed mandrel within the passage at said bend to define a restricted space at the outside of said bend, said mandrel having a curved concave surface adjacent the inside of said bend spaced substantially from the passage wall to provide a laterally enlarged space into which the wall of the tubular stock may wrinkle, forcing the stock through the die partly past said head to extrude the material under pressure at the outside of the bend and to bend the material at the inside of the bend, and thereafter withdrawing the head to shape the material at the inside of said bend under tension.

5. The method of forming an elbow from tubular stock which comprises placing the stock in a die having an elbow shaped passage including an arcuate bend the radius of curvature of which as measured on the external surface at the inside of the bend is not greater than one-third of the outside diameter of the tube, providing a headed mandrel within the passage at said bend to define a restricted space at the outside of said bend, said mandrel having a curved concave surface adjacent the inside of said bend spaced substantially from the passage wall to provide a laterally enlarged space into which the wall of the tubular stock may wrinkle, forcing the stock through the die partly past said head to extrude the material under pressure at the outside of the bend and to bend the material at the inside of the bend, and thereafter withdrawing the head to shape the material at the inside of said bend under tension.

6. The method of making an elbow from a thin walled metal tube which comprises pushing the tube by force applied to its trailing end into a channel of a circular cross-section of substantially the same diameter as the tube, the channel comprising first and second straight portions connected by a curved portion in which the ratio of the radius of curvature, measured at the inside of the curved portion, to the diameter of the channel is not substantially greater than one-third, providing substantial clearance within the second straight channel portion beyond the curved portion at the side thereof adjacent the center of curvature to permit the formation of relatively deep wave-like wrinkles by positioning within said channel a mandrel having a head at one end thereof and a reduced neck adjacent the head, with the head of said mandrel in the curved portion of the passage and the reduced neck of the mandrel in the second straight channel portion during movement of the tube into the passage, stopping movement of the tube while substantial portions remain in both straight channel portions, and thereafter, while the tube remains in the passage, working out the wrinkles in the forward leg of the elbow by applying outwardly acting forces from within the forward leg by withdrawing the mandrel through the second straight channel portion.

References Cited in the file of this patent

UNITED STATES PATENTS

| | | |
|---|---|---|
| 951,717 | Andres | Mar. 8, 1910 |
| 1,164,638 | Frandsen | Dec. 21, 1915 |
| 2,335,342 | Kvarnstrom | Nov. 30, 1943 |

FOREIGN PATENTS

| | | |
|---|---|---|
| 276,537 | Germany | July 14, 1914 |
| 412,075 | Great Britain | June 21, 1934 |